United States Patent
Abdel-Fattah et al.

(10) Patent No.: US 11,807,700 B2
(45) Date of Patent: Nov. 7, 2023

(54) ELECTRO-RESPONSIVE HYDROGEL FOR RESERVOIR AND DOWNHOLE APPLICATION

(71) Applicant: Saudi Arabian Oil Company, Dhahran (SA)

(72) Inventors: Amr Abdel-Fattah, Dhahran (SA); Hala Sadeg, Safwa (SA)

(73) Assignee: Saudi Arabian Oil Company, Dhahran (SA)

( * ) Notice: Subject to any disclaimer, the term of this patent is extended or adjusted under 35 U.S.C. 154(b) by 703 days.

(21) Appl. No.: 16/995,147

(22) Filed: Aug. 17, 2020

(65) Prior Publication Data

US 2022/0049035 A1    Feb. 17, 2022

(51) Int. Cl.
| | |
|---|---|
| *E21B 43/14* | (2006.01) |
| *E21B 34/02* | (2006.01) |
| *E21B 34/06* | (2006.01) |
| *B33Y 70/10* | (2020.01) |
| *B33Y 80/00* | (2015.01) |
| *C08F 220/06* | (2006.01) |
| *B29C 35/08* | (2006.01) |
| *C08L 79/04* | (2006.01) |
| *E21B 43/20* | (2006.01) |

(52) U.S. Cl.
CPC ............ *C08F 220/06* (2013.01); *B29C 35/08* (2013.01); *B33Y 70/10* (2020.01); *B33Y 80/00* (2014.12); *C08L 79/04* (2013.01); *E21B 34/025* (2020.05); *E21B 34/066* (2013.01); *E21B 43/14* (2013.01); *C08G 2210/00* (2013.01); *E21B 43/20* (2013.01)

(58) Field of Classification Search
CPC .......... E21B 43/14; E21B 34/02; E21B 34/06; B33Y 70/10; B33Y 80/00; C08F 220/06
See application file for complete search history.

(56) References Cited

U.S. PATENT DOCUMENTS

| | | | |
|---|---|---|---|
| 8,969,261 | B2 | 3/2015 | Talingting Pabalan et al. |
| 9,770,583 | B2 | 9/2017 | Gupta et al. |
| 2009/0264321 | A1 | 10/2009 | Showalter et al. |
| 2010/0038086 | A1 | 2/2010 | Bunnell et al. |

(Continued)

FOREIGN PATENT DOCUMENTS

| | | |
|---|---|---|
| AU | 2011284552 | 12/2013 |
| EA | 024705 | 10/2016 |

(Continued)

OTHER PUBLICATIONS

Asoh et al., "Electrophoretic adhesion of stimuli-responsive hydrogels." Chemical communications 46.41, 2010, 7793-7795, 3 pages.

(Continued)

*Primary Examiner* — Caixia Lu
(74) *Attorney, Agent, or Firm* — Fish & Richardson P.C.

(57) ABSTRACT

Electro-responsive hydrogel particles are flowed into a first wellbore formed in a subterranean formation. An electric circuit is established between the first wellbore and a second wellbore formed in the subterranean formation. An electric current is applied through the electric circuit, thereby exposing the electro-responsive hydrogel particles to an electric field and causing at least one of swelling or aggregation of the electro-responsive hydrogel particles to form a flow-diverting plug within the subterranean formation. Water is flowed into the first wellbore to increase hydrocarbon production from the second wellbore.

11 Claims, 5 Drawing Sheets

(56) References Cited

U.S. PATENT DOCUMENTS

2010/0314114 A1    12/2010    Moradi-Araghi et al.
2012/0190593 A1    7/2012    Soane et al.

FOREIGN PATENT DOCUMENTS

| | | |
|---|---|---|
| TW | 200643094 | 12/2006 |
| WO | 2005073501 | 8/2005 |
| WO | 2016100647 | 6/2016 |
| WO | 2018031655 | 2/2018 |
| WO | 2019204142 | 10/2019 |

OTHER PUBLICATIONS

Asoh et al., "Rapid fabrication of reconstructible hydrogels by electrophoretic microbead adhesion." Chemical Communications 48.80, 2012, 10019-10021, 3 pages.

Bai et al., "A comprehensive review of polyacrylamide polymer gels for conformance control." Petroleum exploration and development 42.4, 2015, 525-532, 8 pages.

Frampton et al., "Development of a novel waterflood conformance control system.", SPE 89391, SPE/DOE Symposium on Improved Oil Recovery. Society of Petroleum Engineers, 2004, 9 pages.

Gong et al., "Electrokinetic modeling of the contractile phenomena of polyelectrolyte gels. One-dimensional capillary model." The Journal of Physical Chemistry 98.38, 1994, 9583-9587, 5 pages.

Gupta et al., "Hydrogels: from controlled release to pH-responsive drug delivery." Drug discovery today 7.10, 2002, 569-579, 11 pages.

Kabiri et al., "Superabsorbent hydrogel composites." Polymers for Advanced Technologies 14.6, 2003, 438-444, 7 pages.

Kiremitçi et al., "Production of highly crosslinked hydrophilic polymer beads: effect of polymerization conditions on particle size and size distribution." Polymer 33.15, 1992, 3257-3261, 5 pages.

Kwon et al., "Drug release from electric current sensitive polymers." Journal of controlled release 17.2, 1991, 149-156, 7 pages.

Mack et al., "In-depth colloidal dispersion gels improve oil recovery efficiency." SPE/DOE 27780 improved oil recovery symposium. Society of Petroleum Engineers, 1994, 13 pages.

Osada et al., "A polymer gel with electrically driven motility" Nature 355, 1992, 242-244, 3 pages.

Qiu et al., "Environment-sensitive hydrogels for drug delivery." Advanced drug delivery reviews 53.3, 2001, 321-339, 12 pages.

Sawahata et al., "Electrically controlled drug delivery system using polyelectrolyte gels." Journal of Controlled Release 14.3, 1990, 253-262, 10 pages.

Shiga et al., "Electric field-associated deformation of polyelectrolyte gel near a phase transition point." Journal of applied polymer science 46.4, 1992, 635-640, 6 pages.

Tanaka et al., "Collapse of gels in an electric field." Science 218.4571, 1982, 467-469, 3 pages.

Xue et al., "Preparation and Evaluation of Thermo-and Salinity-Responsive Hydrogel as Intelligent Plugging Agent.", SPE-184532-MS, SPE International Conference on Oilfield Chemistry. Society of Petroleum Engineers, 2017, 9 pages.

Zhang et al., "Synthesis and characterization of chitosan-g-poly (acrylic acid)/attapulgite superabsorbent composites." Carbohydrate polymers 68.2, 2007, 367-374, 8 pages.

Wang et al., "Preparation and characterization of a novel pH-sensitive chitosan-g-poly (acrylic acid)/attapulgite/sodium alginate composite hydrogel bead for controlled release of diclofenac sodium," Carbohydrate Polymers 78.4, Nov. 2009, 731-737, 7 pages.

PCT International Search Report and Written Opinion in International Appln. No. PCT/US2021/046255, dated Jan. 5, 2022, 15 pages.

300

350

(12) United States Patent
US 11,807,700 B2

ELECTRO-RESPONSIVE HYDROGEL FOR RESERVOIR AND DOWNHOLE APPLICATION

TECHNICAL FIELD

This disclosure relates to conformance improvement in subterranean formations.

BACKGROUND

Waterflooding involves injection of water into a subterranean formation to increase hydrocarbon production from a hydrocarbon-containing reservoir. The use of water to increase hydrocarbon production is also known as secondary recovery and typically follows primary recovery, which uses the reservoir's natural energy to produce oil to the surface. The injection of water serves to maintain reservoir pressure and sweep oil to improve production from the reservoir. The injected water can displace oil, for example, from pore spaces in the reservoir, but the efficiency of such displacement depends on various factors.

SUMMARY

This disclosure describes technologies relating to an electro-responsive hydrogel for improving conformance in a subterranean formation. Certain aspects of the subject matter described can be implemented as a method. Electro-responsive hydrogel particles are flowed into a first wellbore formed in a subterranean formation. An electric circuit is established between the first wellbore and a second wellbore formed in the subterranean formation. After establishing the electric circuit, an electric current is applied through the electric circuit, thereby exposing the electro-responsive hydrogel particles to an electric field and causing at least one of swelling or aggregation of the electro-responsive hydrogel particles to form a flow-diverting plug within the subterranean formation. While applying the electric current, water is flowed into the first wellbore to increase hydrocarbon production from the second wellbore.

This, and other aspects, can include any of the following features. In some implementations, the electro-responsive hydrogel particles have an average diameter in a range of from 1 nanometer to 10 micrometers. In some implementations, the electro-responsive hydrogel particles are formed from a mixture including a magnesium aluminum phyllosilicate, ammonium persulfate, dimethylenebisacrylamide, and acetic acid. In some implementations, the electro-respective hydrogel particles are dispersed in an aqueous fluid prior to flowing into the first wellbore. In some implementations, flowing the electro-responsive hydrogel particles into the first wellbore includes flowing a dispersion of the electro-responsive hydrogel particles in the aqueous fluid into the first wellbore. In some implementations, the electro-responsive hydrogel particles are present in the dispersion at a concentration in a range of from 0.1 weight percent (wt. %) to 10 wt. %. In some implementations, after flowing water into the first wellbore to increase hydrocarbon production from the second wellbore, the electric current is removed, thereby causing the at least one of swelling or aggregation of the electro-responsive hydrogel particles to reverse and deform the flow-diverting plug. In some implementations, the electric current is a first electric current, and the method includes, after flowing water into the first wellbore to increase hydrocarbon production from the second wellbore, applying a second electric current having an opposite voltage of the first electric current on the electro-responsive hydrogel particles, thereby causing the at least one of swelling or aggregation of the electro-responsive hydrogel particles to reverse and deform the flow-diverting plug.

Certain aspects of the subject matter described can be implemented as a method for producing an electro-responsive hydrogel for use in a subterranean formation. Acrylic acid is polymerized in a mixture with magnesium aluminum phyllosilicate to form particles. The particles are intermingled with a crosslinked alginate matrix to form the electro-responsive hydrogel.

This, and other aspects, can include any of the following features. In some implementations, polymerizing acrylic acid in the mixture with magnesium aluminum phyllosilicate includes mixing the acrylic acid, the magnesium aluminum phyllosilicate, and acetic acid to form a first mixture. In some implementations, polymerizing acrylic acid in the mixture with magnesium aluminum phyllosilicate includes mixing the first mixture, ammonium persulfate, and dimethylenebisacrylamide to form a second mixture. In some implementations, polymerizing acrylic acid in the mixture with magnesium aluminum phyllosilicate includes allowing the acrylic acid of the second mixture to polymerize and form a granular sample. In some implementations, polymerizing acrylic acid in the mixture with magnesium aluminum phyllosilicate includes mixing the granular sample and water to form a slurry. In some implementations, polymerizing acrylic acid in the mixture with magnesium aluminum phyllosilicate includes adding a basic salt to the slurry to raise a pH of the slurry. In some implementations, the particles are formed by drying the slurry to form a solid sample and reducing the solid sample into the particles. In some implementations, intermingling the particles with the crosslinked alginate matrix includes dispersing the particles in an alginate salt solution to form a dispersion. In some implementations, intermingling the particles with the crosslinked alginate matrix includes adding the dispersion to a chloride salt solution to form a third mixture. In some implementations, intermingling the particles with the crosslinked alginate matrix includes allowing the third mixture to crosslink and form encapsulated beads. In some implementations, the electro-responsive hydrogel is formed by rinsing the encapsulated beads with water and drying the encapsulated beads.

Certain aspects of the subject matter described can be implemented as a method for producing an electro-responsive hydrogel for use in a subterranean formation. An inverse emulsion of acrylic acid and magnesium aluminum phyllosilicate dispersed in a continuous phase of toluene is formed. The acrylic acid of the inverse emulsion is polymerized to form the electro-responsive hydrogel.

This, and other aspects, can include any of the following features. In some implementations, forming the inverse emulsion of acrylic acid and magnesium aluminum phyllosilicate dispersed in the continuous phase of toluene includes mixing the acrylic acid, the magnesium phyllosilicate, toluene, and acetic acid to form a first mixture. In some implementations, forming the inverse emulsion of acrylic acid and magnesium aluminum phyllosilicate dispersed in the continuous phase of toluene includes mixing the first mixture and a surfactant to form the inverse emulsion. In some implementations, polymerizing the acrylic acid in the inverse emulsion to form the electro-responsive hydrogel includes adding ammonium persulfate and dimethylbisacrylamide to the inverse emulsion. In some implementations, polymerizing the acrylic acid in the inverse emulsion to form the electro-responsive hydrogel includes allowing the acrylic acid of the inverse emulsion to polymerize and form a granular sample. In some implementations, polymerizing the acrylic acid in the inverse emulsion to form the electro-responsive hydrogel includes mixing the granular sample and a basic salt solution to form a slurry. In some implementations, the electro-responsive hydrogel is formed by drying the slurry.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1:
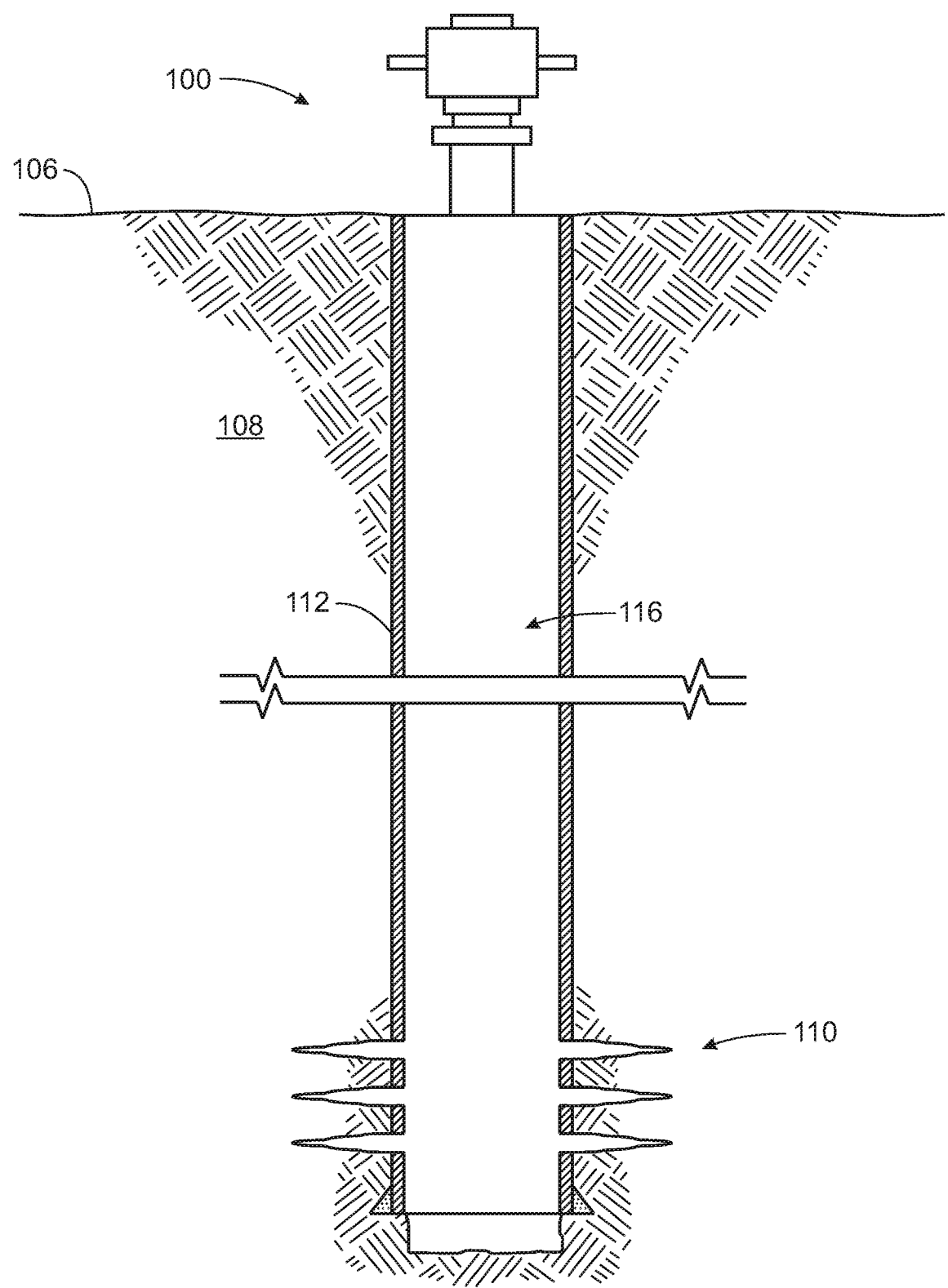
FIG. 1 is a schematic diagram of an example well.

This disclosure describes an electro-responsive (activation in response to exposure to an electric current or field) hydrogel for improving conformance in subterranean formations. Conformance is a measure of the uniformity of a flood front on an injected drive fluid (for example, water) during a hydrocarbon recovery flooding operation (for example, a waterflooding operation). In waterflooding operations, injected water preferentially flows through rock layers with higher water permeability or cuts through oil by viscous fingering, which can result in the injected water bypassing hydrocarbon resources in a reservoir. Water-thief zones are zones in a subterranean formation of relatively high permeability in comparison to neighboring zones and/or large pore sizes. Hydrogels have widely been used to plug water-thief zones in reservoirs. Hydrogels are networks of crosslinked polymer chains in which water serves as a dispersion medium. The hydrogel absorbs water due to the presence of hydrophilic moieties and resists dissolution due to the crosslinks between polymer chains. In some cases, a gelant (a solution including a polymer and crosslinker before the gel is formed) is injected into a subterranean formation, and the gel forms within the subterranean formation. Some challenges associated with injecting a gelant into a subterranean formation can include separation of polymer and crosslinker (for example, due to adsorption), shearing of the gelant, and thinning of the gelant as the gelant flows to the subterranean formation. In some cases, a pre-formed gel is injected into a subterranean formation. Some challenges associated with injecting a pre-formed gel into a subterranean formation can include difficulty of propagating the gel in the subterranean formation and limited swelling capacity under downhole conditions (for example, high temperature and high salinity).

Some examples of conventional types of hydrogels include thermo-responsive (activation in response to temperature change) hydrogels and pH-responsive (activation in response to pH change) hydrogels. These conventional hydrogels, however, are limited in terms of activation control and also control of target location at which activation occurs. The electro-responsive hydrogels described herein can be used to improve sweep and mobility control of hydrocarbon recovery flooding operations with improved control in comparison to conventional hydrogels. In general, the electro-responsive hydrogels described herein are formed from a polyelectrolyte mixture that includes cationic and anionic components, thereby imparting the electro-responsive aspect of the resulting hydrogels. To enhance thermal and mechanical properties of the hydrogel for use in downhole applications, the electro-responsive hydrogels described herein are formed by polymerizing monomers in conjunction with compatible crosslinked networks.

The subject matter described in this disclosure can be implemented in particular implementations, so as to realize one or more of the following advantages. The electro-responsive hydrogels described herein can be designed to be activated in response to exposure to an electric current, regardless of changes in surrounding temperature or salinity. Activation of the electro-responsive hydrogel causes the hydrogel particles to swell, aggregate, or both. In some implementations, the swelling and/or aggregation of the hydrogel particles is reversible (for example, by removing the electric current or applying another electric current with an inverse voltage). The swelling and/or aggregation of the hydrogel particles can block pore throats across a water path within the subterranean formation and divert chase water into otherwise poorly swept zones within the subterranean formation.

FIG. 1 depicts an example well 100 constructed in accordance with the concepts herein. The well 100 extends from the surface 106 through the Earth 108 to one more subterranean zones of interest 110 (one shown). The well 100 enables access to the subterranean zones of interest 110 to allow recovery (that is, production) of fluids to the surface 106 and, in some implementations, additionally or alternatively allows fluids to be placed in the Earth 108. In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well intersects other types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both.

In some implementations, the well 100 is an injection well that is used to inject fluid from the surface 106 and into the subterranean zones of interest 110. The concepts herein, though, are not limited in applicability to injection wells, and could be used in production wells (such as gas wells or oil wells), wells for producing other gas or liquid resources or could be used in injection wells, disposal wells, or other types of wells similarly used in placing fluids into the Earth. The term "gas well" refers to a well that is used in producing gas (such as natural gas) from the subterranean zones of interest 110 to the surface 106. While termed "gas well," the well need not produce only dry gas, and may incidentally or in much smaller quantities, produce liquid including oil, water, or both. The term "oil well" refers to a well that is used in producing hydrocarbon liquid (such as crude oil) from the subterranean zones of interest 110 to the surface 106. While termed an "oil well," the well not need produce only hydrocarbon liquid, and may incidentally or in much smaller quantities, produce gas, water, or both. In some implementations, the production from a gas well or an oil well can be multiphase in any ratio. In some implementations, the production from a gas well or an oil well can produce mostly or entirely liquid at certain times and mostly or entirely gas at other times. For example, in certain types of wells, it is common to produce water for a period of time to gain access to the gas in the subterranean zone.

The wellhead defines an attachment point for other equipment to be attached to the well 100. For example, FIG. 1 shows well 100 being produced with a Christmas tree attached to the wellhead. The Christmas tree includes valves used to regulate flow into or out of the well 100. The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In FIG. 1, the casing 112 is perforated in the subterranean zone of interest 110 to allow fluid communication between the subterranean zone of interest 110 and the bore 116 of the casing 112. In some implementations, the casing 112 is omitted or ceases in the region of the subterranean zone of interest 110. This portion of the well 100 without casing is often referred to as "open hole."

In particular, casing 112 is commercially produced in a number of common sizes specified by the American Petroleum Institute (the "API"), including 4½, 5, 5½, 6, 6⅝, 7, 7⅝, 7¾, 8⅝, 8¾, 9⅝, 9¾, 9⅞, 10¾, 11¾, 11⅞, 13⅜, 1½, 13⅝, 16, 18⅝, and 20 inches, and the API specifies internal diameters for each casing size.

Figure 2A:
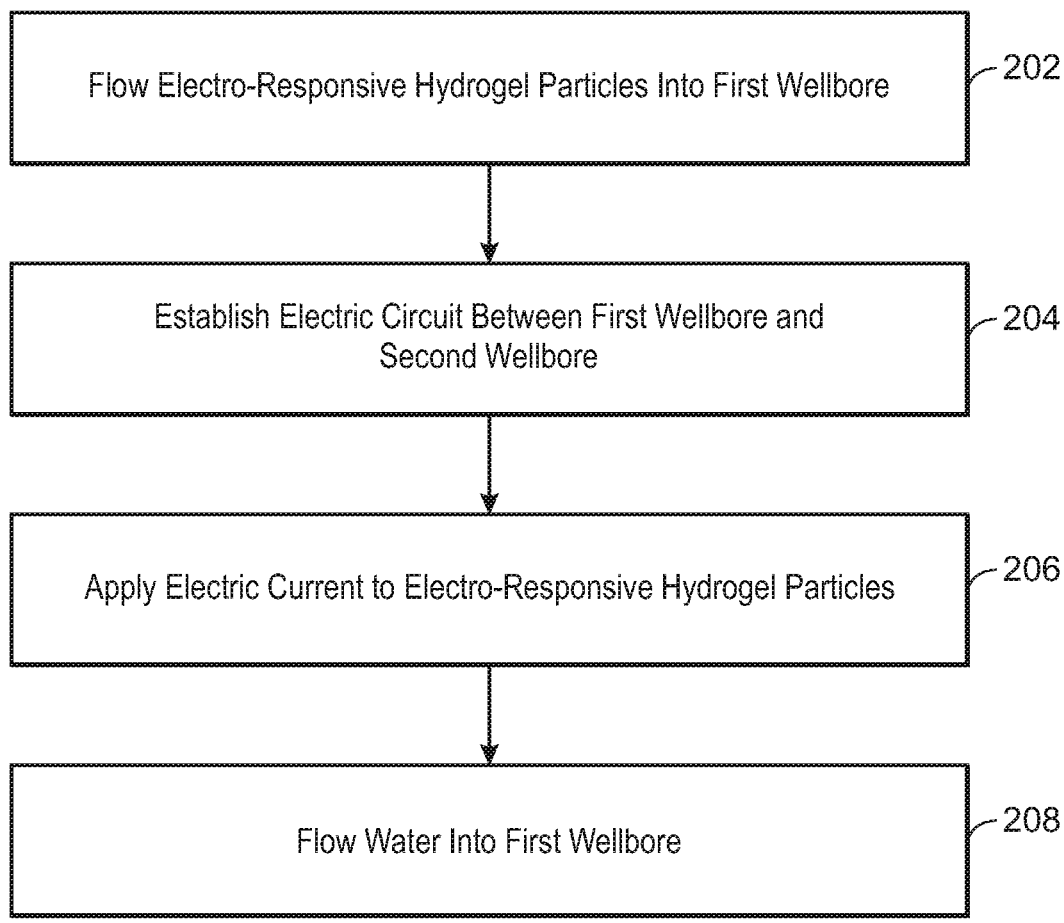
FIG. 2A is a flow chart of an example method for treating the well of FIG. 1.

FIG. 2A is a flow chart of a method 200 that can be implemented, for example, to improve conformance in a subterranean formation. At step 202, unswollen electro-responsive hydrogel particles are flowed into a first wellbore formed in the subterranean formation (for example, the well 100). In some implementations, the electro-responsive hydrogel particles have an average diameter in a range of from 1 nanometer (nm) to 10 micrometers (μm). In some implementations, the electro-responsive hydrogel particles are formed from a mixture that includes magnesium aluminum phyllosilicate, ammonium persulfate, dimethylenebisacrylamide, and acetic acid. Some implementations of forming the electro-responsive hydrogel particles are described later.

In some implementations, the unswollen electro-responsive hydrogel particles are dispersed in an aqueous fluid prior to flowing the electro-responsive hydrogel particles at step 202. In such implementations, flowing the electro-responsive hydrogel particles into the first wellbore at step 202 includes flowing a dispersion of the electro-responsive hydrogel particles in the aqueous fluid into the first wellbore. In some implementations, the electro-responsive hydrogel particles are present in the dispersion at a concentration in a range of from 0.1 weight percent (wt. %) to 10 wt. %.

Figure 2B:
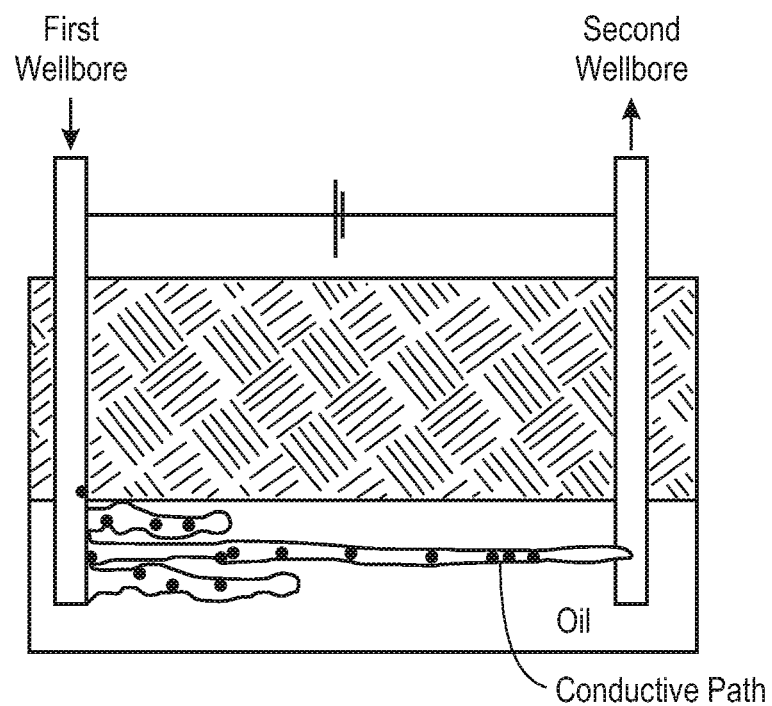
FIGS. 2B and 2C are schematic diagrams of an example progression of some steps of the method (flow chart of FIG. 2A).

At step 204, an electric circuit is established between the first wellbore and a second wellbore formed in the subterranean formation (for example, another implementation of the well 100). For example, the first wellbore is part of an injection well, and the second wellbore is part of a production well. In some implementations, establishing the electric circuit at step 204 includes forming a conductive path between the first wellbore and the second wellbore. In some instances, the aqueous fluid flowed at step 202 breaks through (for example, through a thief zone) and establishes a closed electric circuit between the first wellbore and second wellbore, thereby allowing for a passage of electric current through the thief zone. An implementation in which the aqueous fluid has broken through and formed a conductive path between the first and second wellbores is shown in FIG. 2B.

Figure 2C:
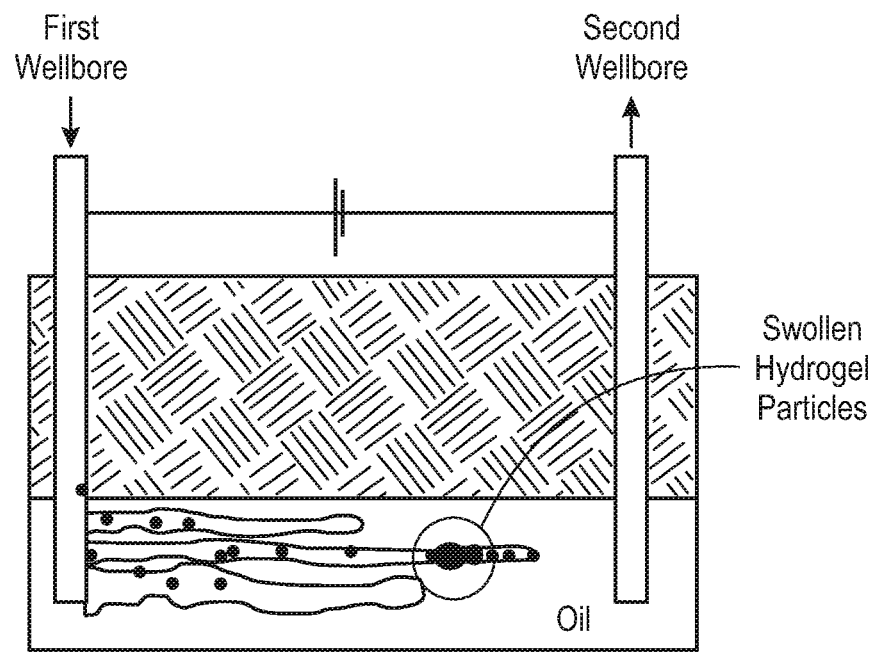

Referring back to FIG. 2A, after establishing the electric circuit at step 204, an electric current is applied through the electric circuit at step 206, thereby exposing the electro-responsive hydrogel particles to an electric field and causing the electro-responsive hydrogel particles to swell, aggregate, or both swell and aggregate to form a flow-diverting plug within the subterranean formation. The voltage of the electric current applied at step 206 can depend on various factors, such as downhole conditions and downhole fluid composition. In some implementations, applying the electric current at step 206 is delayed until the electro-responsive hydrogel particles have reached a target location or target locations within the subterranean formation, such that the electro-responsive hydrogel particles do not prematurely swell and/or aggregate at a location different from the target location(s). The swelling and/or aggregation of the electro-responsive hydrogel particles can seal the thief zones within the subterranean formation, which can facilitate redistribution of pore pressure gradients and enhance sweep efficiency. An implementation in which some electro-responsive hydrogel particles have swelled and/or aggregated to form a seal within the subterranean formation is shown in FIG. 2C.

Referring back to FIG. 2A, in some implementations, the electric current is continuously provided (for example, at the first wellbore) at step 206. In such implementations, whenever the electric circuit is established at step 204, the electric current flows through the subterranean formation along the conductive path(s) provided by the aqueous fluid that has broken through the thief zone(s). Each time that a conductive path forms, establishing an electric circuit between the first and second wellbores, the electric current that flows through the circuit causes the swelling and/or aggregation of the electro-responsive hydrogel particles within the subterranean formation. This process can be repeated until most or all of the thief zones within the subterranean formation have been sealed by the swelled and/or aggregated electro-responsive hydrogel particles.

While applying the electric current at step 206, water is flowed into the first wellbore at step 208 to increase hydrocarbon production from the second wellbore. In some implementations, additives are flowed with the water at step 208. For example, similar or the same additives that were included in the aqueous fluid (within which the electro-responsive hydrogel particles were dispersed for flowing into the first wellbore at step 202) are included with the water flowed into the wellbore at step 208. Because the swelled and/or aggregated electro-responsive hydrogel particles have sealed thief zones within the subterranean formation, the water flooding at step 208 can have improved sweep efficiency, and hydrocarbon recovery from the second wellbore (production well) can be increased.

In some implementations, after flowing water into the first wellbore at step 208, the electric current that was applied at step 206 is removed from the electro-responsive hydrogel particles, thereby causing reversal of swelling, aggregation, or both swelling and aggregation of the electro-responsive particles and, in turn, deformation of the flow-diverting plug.

In some implementations, the electric current applied at step 206 is a first electric current, and after flowing water into the first wellbore at step 208, a second electric current having an opposite (inverse) voltage of the first electric current is applied to the electro-responsive hydrogel particles, thereby causing reversal of swelling, aggregation, or both swelling and aggregation of the electro-responsive particles and, in turn, deformation of the flow-diverting plug.

Figure 3A:
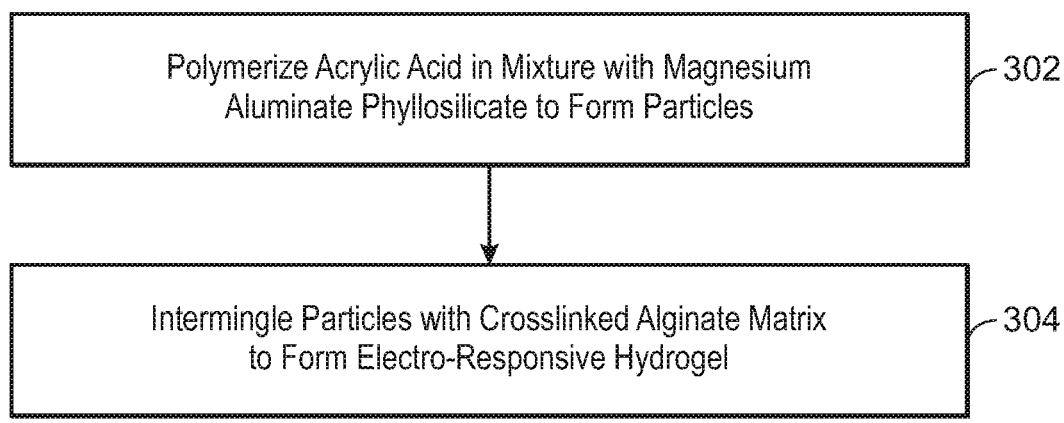
FIG. 3A is a flow chart of an example method for producing a treatment composition that can be used to treat the well of FIG. 1.

FIG. 3A is a flow chart of a method 300 that can be implemented to produce an electro-responsive hydrogel for use in a subterranean formation. The electro-responsive hydrogel produced by method 300 can, for example, be used in method 200. At step 302, a monomer is polymerized in a mixture with inorganic material (for example, clay) to form particles. The inorganic material can improve thermal and mechanical properties of the resulting hydrogel. For example, the inorganic material can react with the monomer and act as a crosslinking point in the gel network, which can cause a crosslinking density of the hydrogel to increase. The inclusion of inorganic material at step 302 can therefore result in an increase in crosslinking density, which can improve the resulting hydrogel strength. In some implementations, the monomer at step 302 is acrylic acid, acrylamide, sodium acrylate, or methacrylic acid. In some implementations, the inorganic material at step 302 is magnesium aluminum phyllosilicate (for example, attapulgite).

In some implementations, polymerizing acrylic acid in the mixture with magnesium aluminum phyllosilicate at step 302 includes mixing acrylic acid, magnesium aluminum phyllosilicate, and a carboxylic acid (for example, acetic acid) to form a first mixture. The carboxylic acid (for example, acetic acid) in the first mixture can serve as a solvent due to its hydrophilicity, moderate dielectric constant, ability to dissolve both polar and non-polar compounds, and miscibility in polar and non-polar solvents. An advantage of including acetic acid is its antiseptic/antibacterial properties. In some implementations, polymerizing acrylic acid in the mixture with magnesium aluminum phyllosilicate at step 302 includes mixing the first mixture, an initiator, and a crosslinking agent to form a second mixture. In some implementations, the initiator in the second mixture at step 302 is ammonium persulfate (APS), sodium persulfate, potassium persulfate, tetramethylethylenediamine, or azobisisobutyronitrile (AIBN). In some implementations in which APS is included as the initiator in the first mixture at step 302, the APS can be present in the first mixture in an amount that is equal to or approximately equal to 3% of the amount of the monomer (for example, acrylic acid) present in the first mixture. In some implementations, the crosslinking agent in the second mixture at step 302 is a crosslinking agent that includes an acrylamide functional group. In some implementations, the crosslinking agent in the second mixture at step 302 is dimethylenebisacrylamide, 1,4-phenylene-bis-acrylamide, N,N'-bis(acryloyl)cystamine, or 2-(methacryloylamino)ethyl 2-methyl acrylate. It can be beneficial for the crosslinking agent in the second mixture at step 302 to include more than one reagent functional group, so that the polyacrylamide chains form firm networks in contrast to forming less-rigid networks that include unconnected linear polyacrylamide chains. In some implementations, polymerizing acrylic acid in the mixture with magnesium aluminum phyllosilicate at step 302 includes allowing the acrylic acid in the second mixture to polymerize and form a granular sample. In some implementations, polymerizing acrylic acid in the mixture with magnesium aluminum phyllosilicate at step 302 includes mixing the granular sample and water to form a slurry. In some implementations, polymerizing acrylic acid in the mixture with magnesium aluminum phyllosilicate at step 302 includes adding a basic salt to the slurry to raise a pH of the slurry. A basic salt is a salt that dissociates in water to form a basic solution (pH greater than 7). In some implementations, the basic salt used to raise the pH of the slurry is sodium hydroxide. In some implementations, adding the basic salt to the slurry results in the pH of the slurry to be 7 or approximately 7. In some implementations, the basic salt is added to the slurry in the form of a basic salt solution (for example, an aqueous solution of the basic salt). In some implementations, the slurry is dried to form a solid sample, and then the solid sample is reduced to form the particles at step 302. In some implementations, drying the slurry includes adding a dewatering agent (for example, ethanol or isopropyl alcohol) to the slurry to dehydrate the slurry.

At step 304, the particles formed at step 302 are intermingled with a crosslinked polymer matrix (for example, a crosslinked alginate matrix) to form the electro-responsive hydrogel. The electro-responsive hydrogel formed at step 304 can be in the form of electro-responsive hydrogel particles. Intermingling the particles with the crosslinked alginate matrix at step 304 maintains the electro-responsive aspect of the resulting hydrogel, as the intermingling material is made of a polyelectrolyte mixture including cationic and anionic components.

In some implementations, encapsulating the particles at step 304 includes dispersing the particles in an alginate salt solution (for example, a sodium alginate, potassium alginate, or calcium alginate solution) to form a dispersion. In some implementations, encapsulating the particles at step 304 includes adding the dispersion to a chloride salt solution (for example, a calcium chloride solution) to form a third mixture. In some implementations, the dispersion is added drop-wise to the chloride salt solution to form the third mixture. In some implementations, encapsulating the particles at step 304 includes allowing the third mixture to crosslink and form encapsulated beads. In some implementations, the encapsulated beads are rinsed with water and then dried to form the electro-responsive hydrogel particles at step 304.

Figure 3B:
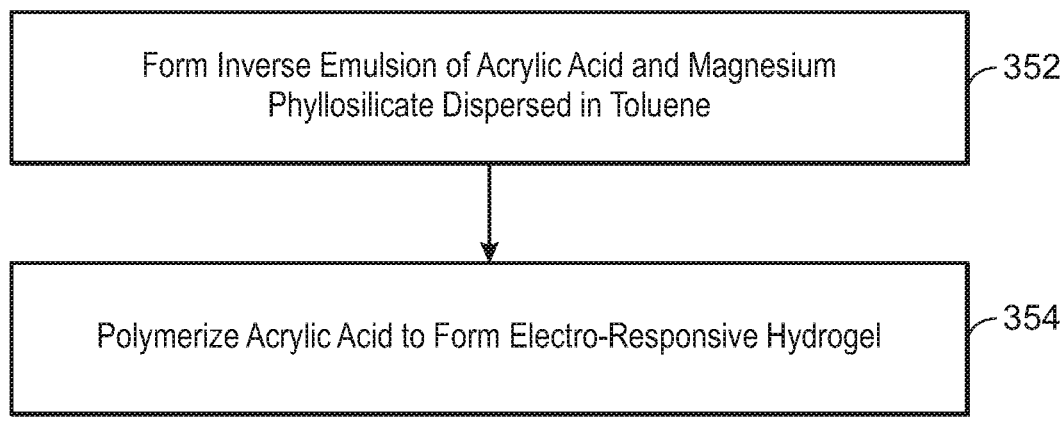
FIG. 3B is a flow chart of an example method for producing a treatment composition that can be used to treat the well of FIG. 1.

FIG. 3B is a flow chart of a method 350 that can be implemented to produce an electro-responsive hydrogel for use in a subterranean formation. The electro-responsive hydrogel produced by method 350 can, for example, be used in method 200. At step 352, an inverse emulsion of acrylic acid and magnesium aluminum phyllosilicate (for example, attapulgite) dispersed in a continuous oil phase is formed. The continuous oil phase provides an environment for the hydrophilic monomer (for example, acrylic acid) to be emulsified and polymerized to synthesize the electro-responsive hydrogel via inverse emulsion polymerization. In some implementations, the continuous oil phase at step 352 is a continuous phase of toluene.

In some implementations, forming the inverse emulsion at step 352 includes mixing acrylic acid, magnesium aluminum phyllosilicate, toluene, and acetic acid to form a first mixture. In some implementations, forming the inverse emulsion at step 352 includes mixing the first mixture and a surfactant to form the inverse emulsion. The surfactant includes a hydrophilic portion and a hydrophobic portion and forms an encapsulating interface between the continuous phase of toluene and the remaining components (acrylic acid, acetic acid, and the magnesium aluminum phyllosilicate dispersed in the acids). In some implementations, the surfactant is a non-ionic surfactant, such as sorbitan oleate.

At step 354, the acrylic acid in the inverse emulsion is polymerized to form the electro-responsive hydrogel. The electro-responsive hydrogel formed at step 354 can be in the form of electro-responsive hydrogel particles.

In some implementations, polymerizing the acrylic acid in the inverse emulsion at step 354 includes adding ammonium persulfate and dimethylbisacrylamide to the inverse emulsion. In some implementations, polymerizing the acrylic acid in the inverse emulsion at step 354 includes allowing the acrylic acid in the inverse emulsion to polymerize and form a granular sample. In some implementations, polymerizing the acrylic acid in the inverse emulsion at step 354 includes mixing the granular sample and a basic salt solution (for example, a sodium hydroxide solution) to form a slurry. In some implementations, mixing the granular sample and the basic salt solution results in the slurry having a pH of 7 or approximately 7. In some implementations, the slurry is dried to form the electro-responsive hydrogel at step 354. In some implementations, drying the slurry includes adding a dewatering agent (for example, ethanol) to the slurry to dehydrate the slurry.

EXAMPLE 1

3.55 grams (g) of acrylic acid and 0.355 g of attapulgite are added to 30 milliliters (mL) of 1% acetic acid solution in a 250 mL flask equipped with a mechanical stirrer, reflux condenser, and a nitrogen purge line. Prior to adding the attapulgite to the acetic acid solution, the attapulgite is milled through a 320-mesh screen, treated with 37% hydrochloric acid for 72 hours, rinsed with distilled water until a pH of 6 is achieved, and dried at 105 degrees Celsius (° C.) for 8 hours. The flask is purged with nitrogen for 30 minutes. The flask is heated in a water bath at 60° C. 0.1 g of ammonium persulfate is added to the flask. 0.15 g of dimethylenebisacrylamide (N,N'-methylenebisacrylamide) is added to the flask. The flask is allowed to rest in the water bath at 60° C. for 3 hours for polymerization to occur. The resulting granular product is transferred to another flask including distilled water. 1 molar (M) sodium hydroxide is added to this flask until the solution's pH is neutralized to 7. The solution is dehydrated with ethanol. Excess dewatering agent is wiped off from the surface of the solid material using filter paper. The sample is dried overnight at ambient conditions. The sample is milled through an 80-mesh screen to reduce the sample into particles. 0.5 g of the particles are placed into a 250 mL flask. Sodium alginate is added to the flask. The contents in the flask are stirred with a stirrer rotating at 1,000 revolutions per minute (rpm) for 4 hours. A 0.45 millimeter (mm) syringe is used to withdraw fluid from the flask. The fluid from the syringe is added dropwise to a calcium chloride solution at a rate of 1.50 milliliters per minute (mL/min) while stirring. The mixture is allowed to rest for 2 hours for crosslinking to occur. The resulting beads are transported and rinsed with distilled water three times to remove unreacted calcium chloride. The rinsed beads are dried in an oven at 80° C. The dried beads are an implementation of the electro-responsive hydrogel particles that can be used in method 200.

EXAMPLE 2

4.9 g of acrylic acid and 0.49 g of attapulgite are added to 35 mL of toluene with 1% acetic acid in a 250 mL flask equipped with a mechanical stirrer, reflux condenser, and a nitrogen purge line. Prior to adding the attapulgite to the acetic acid solution, the attapulgite is milled through a 320-mesh screen, treated with 37% hydrochloric acid for 72 hours, rinsed with distilled water until a pH of 6 is achieved, and dried at 105 degrees Celsius (° C.) for 8 hours. The flask is purged with nitrogen for 30 minutes. The flask is heated in a water bath at 60° C. The contents in the flask are stirred with a stirrer rotating at 200 rpm. 0.024 g of Span® 80 surfactant are added to the flask. 0.01266 g of ammonium persulfate are added to the flask. 0.00501 g of dimethylbisacrylamide are added to the flask. The flask is allowed to rest in the water bath at 60° C. for 6 hours for polymerization to occur. The resulting granular product is transferred to another flask including 1 M sodium hydroxide, such that the solution's pH is neutralized to 7. The solution is dehydrated with ethanol. Excess dewatering agent is wiped off from the surface of the solid material using filter paper. The solid material is dried overnight at ambient conditions. The dried solid material (which can be in the form of particles) is an implementation of the electro-responsive hydrogel that can be used in method 200.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
    flowing a plurality of electro-responsive hydrogel particles into a first wellbore formed in a subterranean formation;
    establishing an electric circuit between the first wellbore and a second wellbore formed in the subterranean formation;
    after establishing the electric circuit, applying an electric current through the electric circuit, thereby exposing the plurality of electro-responsive hydrogel particles to an electric field and causing at least one of swelling or aggregation of the plurality of electro-responsive hydrogel particles to form a flow-diverting plug within the subterranean formation; and
    while applying the electric current, flowing water into the first wellbore to increase hydrocarbon production from the second wellbore.

2. The method of claim 1, wherein the plurality of electro-responsive hydrogel particles has an average diameter in a range of from 1 nanometer (nm) to 10 micrometers (μm).

3. The method of claim 2, wherein the plurality of electro-responsive hydrogel particles is formed by polymerizing a mixture comprising a magnesium aluminum phyllosilicate, ammonium persulfate, N,N'-methylenebisacrylamide, and acrylic acid.

4. The method of claim 2, wherein the plurality of electro-responsive hydrogel particles is dispersed in an aqueous fluid prior to flowing into the first wellbore, and flowing the plurality of electro-responsive hydrogel particles into the first wellbore comprises flowing a dispersion of the plurality of electro-responsive hydrogel particles in the aqueous fluid into the first wellbore, and the plurality of electro-responsive hydrogel particles is present in the dispersion at a concentration in a range of from 0.1 weight percent (wt. %) to 10 wt. %.

5. The method of claim 4, comprising, after flowing water into the first wellbore to increase hydrocarbon production from the second wellbore, removing the electric current, thereby causing the at least one of swelling or aggregation of the plurality of electro-responsive hydrogel particles to reverse and deform the flow-diverting plug.

6. The method of claim 4, wherein the electric current is a first electric current, and the method comprises, after flowing water into the first wellbore to increase hydrocarbon production from the second wellbore, applying a second electric current having an opposite voltage of the first electric current on the plurality of electro-responsive hydrogel particles, thereby causing the at least one of swelling or aggregation of the plurality of electro-responsive hydrogel particles to reverse and deform the flow-diverting plug.

7. A method for producing an electro-responsive hydrogel for use in a subterranean formation, the method comprising:
    polymerizing acrylic acid in a mixture with magnesium aluminum phyllosilicate to form a plurality of particles; and
    intermingling the plurality of particles with a crosslinked alginate matrix to form the electro-responsive hydrogel.

8. The method of claim 7, wherein polymerizing acrylic acid in the mixture with magnesium aluminum phyllosilicate comprises:
    mixing the acrylic acid, the magnesium aluminum phyllosilicate, and acetic acid to form a first mixture;
    mixing the first mixture, ammonium persulfate, and dimethylenebisacrylamide to form a second mixture;
    allowing the acrylic acid of the second mixture to polymerize and form a granular sample;
    mixing the granular sample and water to form a slurry; and
    adding a basic salt to the slurry to raise a pH of the slurry.

9. The method of claim 8, wherein the plurality of particles are formed by drying the slurry to form a solid sample and reducing the solid sample into the plurality of particles.

10. The method of claim 9, wherein intermingling the plurality of particles with the crosslinked alginate matrix comprises:
    dispersing the plurality of particles in an alginate salt solution to form a dispersion;
    adding the dispersion to a chloride salt solution to form a third mixture; and
    allowing the third mixture to crosslink and form a plurality of encapsulated beads.

11. The method of claim 10, wherein the electro-responsive hydrogel is formed by rinsing the plurality of encapsulated beads with water and drying the plurality of encapsulated beads.

* * * * *